United States Patent [19]

Lammers

[11] Patent Number: 5,035,305

[45] Date of Patent: Jul. 30, 1991

[54] CUSHIONED BRAKE ASSEMBLY

[75] Inventor: Bryan G. Lammers, Washington, Ill.

[73] Assignee: Caterpillar Inc., Peoria, Ill.

[21] Appl. No.: 415,678

[22] Filed: Oct. 2, 1989

[51] Int. Cl.[5] ............................................. F16D 55/36
[52] U.S. Cl. .................................. 188/71.5; 188/72.4;
188/73.38; 188/250 E; 188/264 A; 188/217;
188/170; 188/72.3; 192/85 AA; 192/109 F
[58] Field of Search ...................... 188/72.4, 71.5, 366,
188/367, 250 E, 72.3, 73.2, 264 A, 216, 217, 218
A, 18 A, 170, 73.38, 73.37, 71.6; 192/70.12,
70.14, 70.17, 70.2, 70.21, 85 R, 85 AA, 109 F

[56] References Cited

U.S. PATENT DOCUMENTS

| | | | |
|---|---|---|---|
| 2,244,169 | 6/1941 | Miller | 192/68 |
| 2,540,965 | 2/1951 | Schellinger | 192/52 |
| 3,054,491 | 9/1962 | Bloch | 192/87 |
| 3,285,379 | 11/1966 | Helquist | 192/85 |
| 3,353,641 | 11/1967 | Chana | 192/85 |
| 3,612,237 | 10/1971 | Honda | 192/85 |
| 4,346,791 | 8/1982 | Cumming | 188/71.5 |
| 4,371,066 | 2/1983 | Fujioka | 192/85 |
| 4,676,356 | 6/1987 | Beccaris | 192/70.28 |

FOREIGN PATENT DOCUMENTS 2149863A 6/1985 United Kingdom .

Primary Examiner—Douglas C. Butler
Attorney, Agent, or Firm—Claude F. White

[57] ABSTRACT

A cushioned brake assembly for dampening the reaction forces between rotating and non-rotating components of the brake assembly during a breaking action, includes a plurality of alternating rotatable and non-rotatable discs, a fluid actuated piston, a spring element, and a cushion disc positioned between the piston and the discs. The cushion disc includes a resilient portion which is compressed during a braking action to dampen the reaction forces. Prior art clutch and brake assemblies utilize various types of spring elements to dampen reaction forces between rotating and non-rotating components during clutching and braking. These prior art dampening elements do not provide optimum damping functions. The subject cushioned brake assembly provides optimum spring rate characteristics during cushioned braking function.

12 Claims, 3 Drawing Sheets

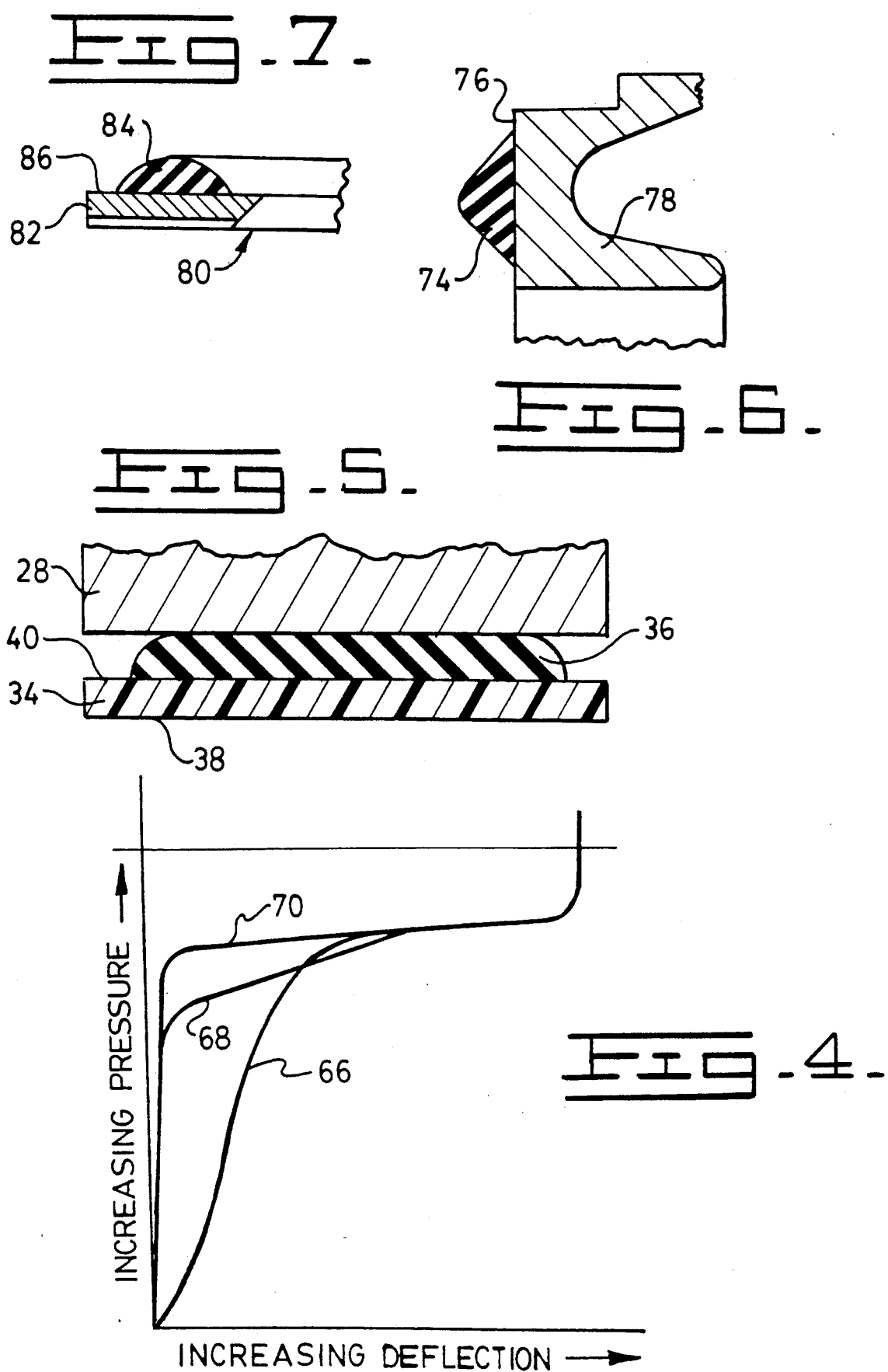

CUSHIONED BRAKE ASSEMBLY

TECHNICAL FIELD

This invention relates generally to a power transfer assembly, such as a brake assembly, and more particularly to a brake assembly having cushioning means to dampen the reaction forces between the brake assembly components.

BACKGROUND ART

Brake and clutch assemblies, which utilize large diameter multiple stationary and rotating discs for the braking and clutching functions, generate considerable shock forces during operation of the brake or clutch. Various mechanisms have been used in an attempt to cushion and smooth the shock from freewheeling to a braking action. These prior art mechanism include a variety of shapes and sizes of spring elements.

One type of cushioning element used in a clutch or brake unit is shown in U.S. Pat. No. 3,353,641, issued to H. E. Chana on Nov. 21, 1967. In this patent, an annular elastomeric cushioning member is disposed in a groove formed in the face of a piston. As the friction plates are engaged in response to movement of the piston, the cushioning member initially deflects to provide a gradually increasing spring rate and gradual loading of the friction plates. Further movement of the piston increases the applying force of the cushioning member on the friction plates until the plates are in total intimate frictional contact. Deflection of the cushioning member is stated as being limited by the depth of the groove in the piston face, as the face of the piston becomes flush with the brake pack.

Another type of cushioning element is shown in U.S. Pat. No. 3,285,379, issued to C. A. Helquist on Nov. 15, 1966. The cushioning element disclosed in this patent is a circular wave spring and is shown being used in the environment of a fluid pressure clutch assembly. As in the previously noted patent, the wave spring is located within a groove in the face of the clutch actuating piston. Operation is also similar to the above noted patent, in that movement of the piston brings the wave spring into contact with a disc of the clutch assembly. Further movement of the piston causes the spring to yield and cushion the frictional engaging force between the friction discs of the clutch assembly. The piston face will engage the clutch disc before the wave spring bottoms out.

Although the above noted cushioning elements will provide a cushioning action for the engaging members of the brake and clutch assemblies, they would seem to provide less than the optimum spring rate characteristics, since only a portion of the brake load is cushioned. The force applying piston disclosed in each patent would be difficult and expensive to manufacture in view of the groove required in the face of the piston.

The present invention is directed to overcoming one or more of the problems as set forth above.

DISCLOSURE OF THE INVENTION

In one aspect of the present invention, a cushioned power transfer assembly includes a stationary housing, a rotatable hub, a power shaft splined to the hub, a plurality of first friction discs splined to the housing, and a plurality of second friction discs splined to the hub. The assembly further includes a moveable piston positioned within the housing, a cushion disc positioned between the piston and the friction discs, and power means for moving the piston into contact with the cushion disc.

Power transfer assemblies, such as clutch and brake assemblies, which utilize multiple friction disc for the clutching and braking functions, often produce sudden shock loading of the associated vehicle and operator when the friction discs actuated. In a brake assembly, the vehicle operator can be jerked forward as the brake assembly changes from free-wheeling to braking. Many of the prior art clutch and brake assemblies have incorporated various types of springs into the assemblies for the purpose of cushioning the shock loading. Although these spring elements have improved the shock loading conditions, they have not provided an ideal cushioning system which offer a smooth transition from a free-wheeling condition to a fully braked condition.

The subject invention provides an optimum cushioned power transfer assembly producing a very smooth braking function. The subject invention utilizes a cushioning element which is simple and inexpensive to produce.

BRIEF DESCRIPTION OF THE DRAWINGS

FIG. 4 is a diagrammatic chart illustrating load-deflection curves of the present invention and prior art systems;

FIG. 5 is a diagrammatic sectional view of a cushioning element of the present invention in a fully loaded condition;

FIG. 6 is a diagrammatic sectional view of an alternate embodiment of the present invention; and FIG. 7 is a diagrammatic sectional view of another alternate embodiment of the present invention.

BEST MODE FOR CARRYING OUT THE INVENTION

Figure 1:
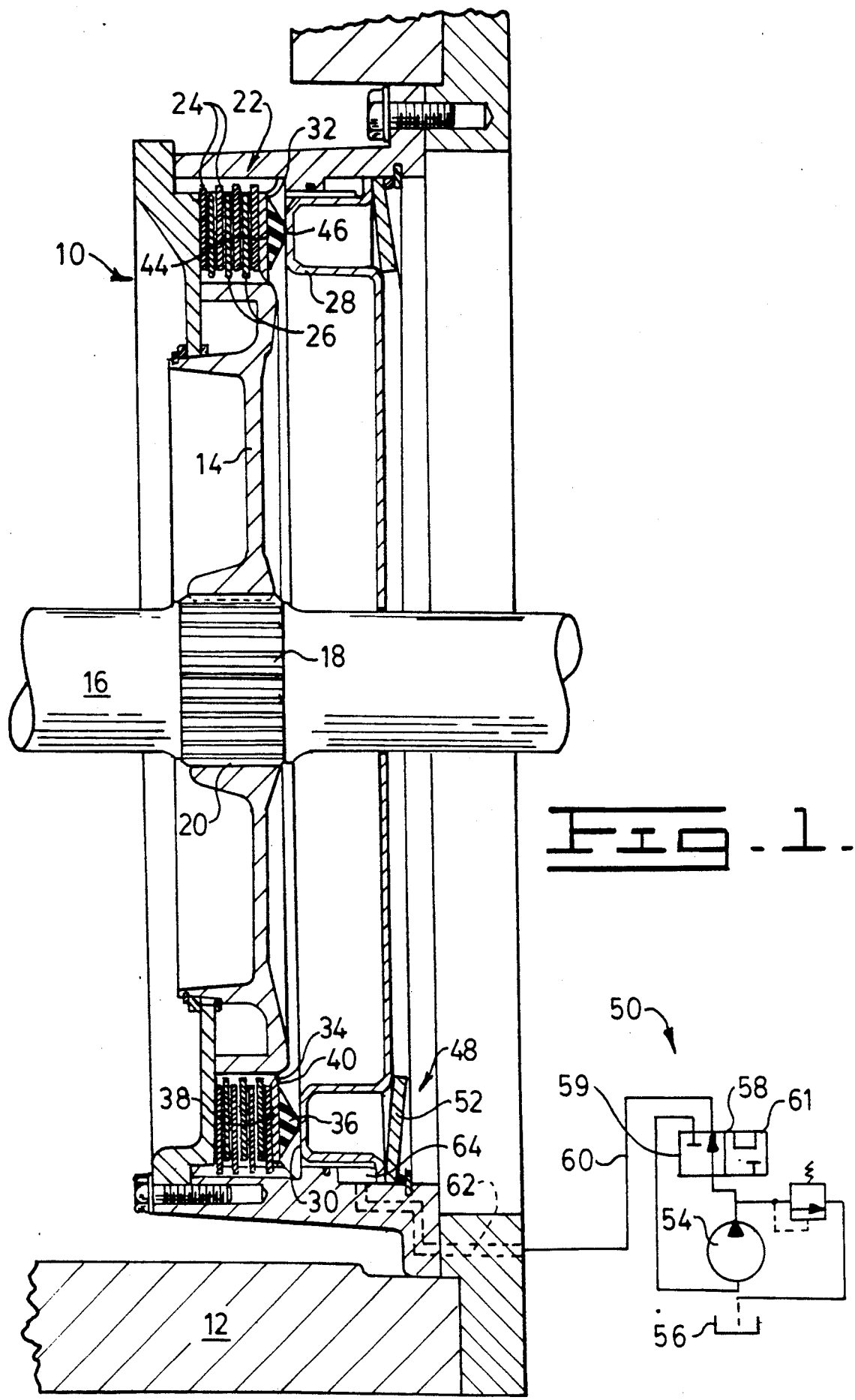
FIG. 1 is a diagrammatic sectional view of a brake assembly incorporating the cushioning system of the present invention.
Figure 3:
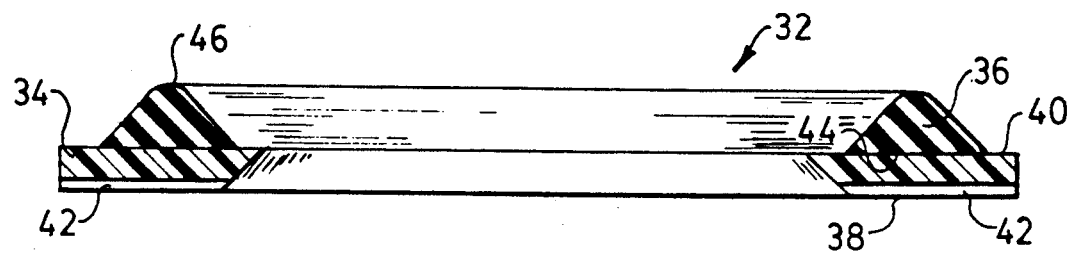
FIG. 3 is a diagrammatic sectional view taken generally along the lines 3—3 of FIG. 2.
Figure 2:
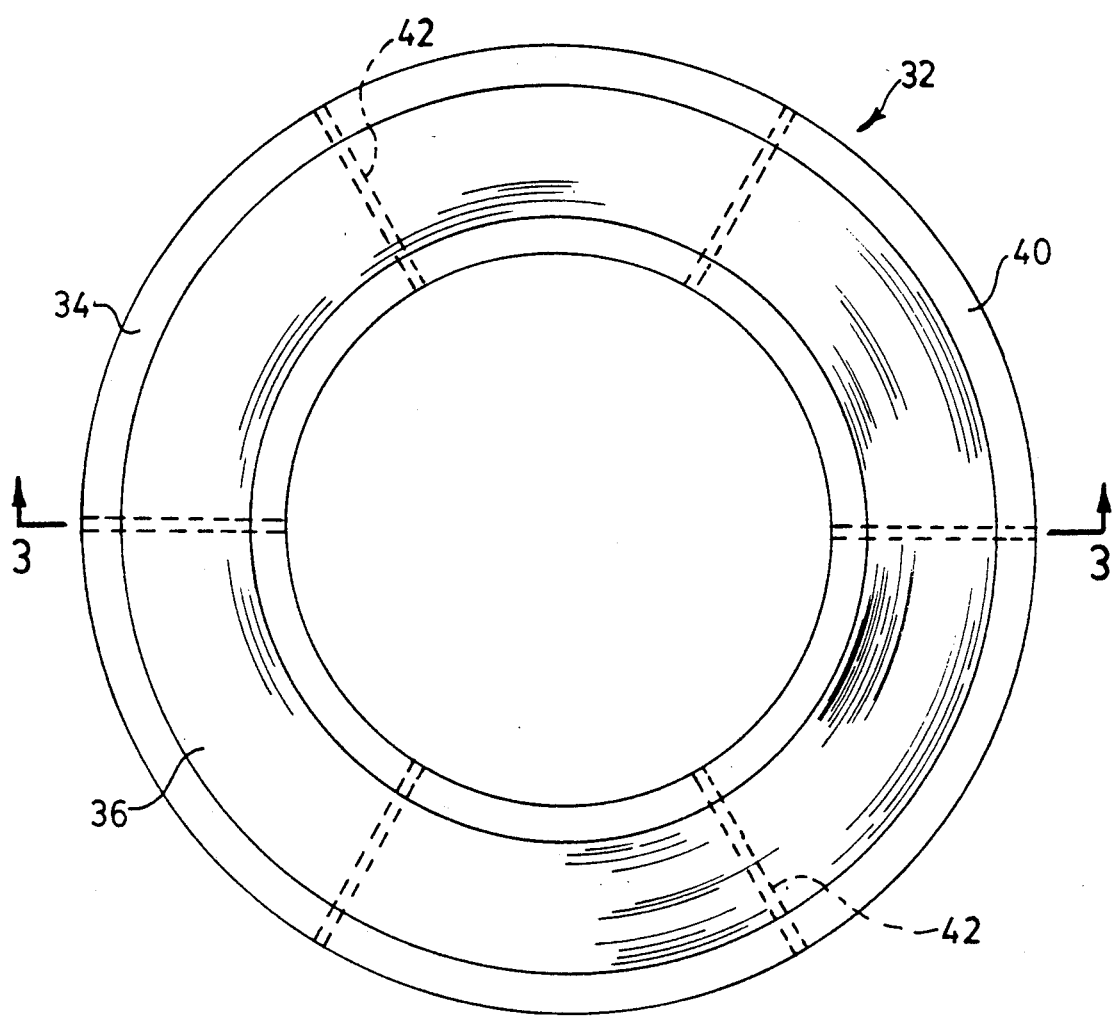
FIG. 2 is a diagrammatic enlarged plan view of a cushioning element of the present invention.

Referring to the drawings, a cushioned power transfer assembly 10, such as a cushioned friction disc brake assembly 10, has a stationary non-rotatable housing 12, a rotatable hub 14, and a rotatable power shaft 16. The shaft 16 has a plurality of first splines 18 which interconnect with a plurality of mating second splines 20 on the hub 14 for imparting rotary motion from the shaft 16 to the hub 14. The brake assembly 10 further includes a disc pack 22 having a plurality of first friction discs 24 which are splined to the housing 12 and a plurality of second friction discs 26 which are splined to the hub 14. The first and second friction discs 24,26 are arranged in an alternating pattern with each of the second friction discs 26 being adjacent at least one of the first friction discs 24. A powered piston 28, having a substantially flat planar contact surface 30, is positioned within the housing 12 and is moveable relative to the housing 12 toward and away from the disc pack 22.

A floating cushion disc 32 is positioned within the housing 12 between the piston 28 and the friction discs 24,26. The cushion disc 32 has a rigid plate-like portion 34 and a resilient portion 36. The rigid portion 34 is formed of either thermoplastic material or metal and the resilient portion 36 is formed of any suitable oil and temperature resistant rubber or elastomeric material. The rigid portion 34 has first and second circular surfaces 38,40 with the first surface 38 having a plurality of slots 42 formed therein and being adjacent the friction discs 24,26. The slots 42 allow cooling fluid to flow across the surface 38 during actuation of the brake assembly 10. The cooling slots 42 may be eliminated if a high temperature elastomer is used to form the resilient portion 36. The resilient portion 36 has a large flat base which is bonded to the second surface 40 of the rigid portion 34 with a suitable bonding agent. The resilient portion 36 has a substantially triangular or dome-shaped configuration in cross-section with the peak 46 adjacent the planar surface 30 of the piston 28. This produces the favorable non-linear load buildup on the brake pack.

A first power means 48 moves the piston 28 into contact with the resilient portion 36 of the cushion disc 32 when the brake assembly 10 is activated. A second power means 50 moves the piston 28 away from the resilient portion 36 when the brake assembly 10 is de-activated. In the embodiment illustrated in FIG. 1, the first power means 48 includes one or more spring elements 52. The second power means includes a source of fluid pressure, including a fluid pump 54, a reservoir 56, a control valve 58, fluid lines 60, fluid passageways 62, and a fluid cylinder 64. The control valve 58 is moveable from the first position 59 to the second position 61. In the position of the brake assembly 10 illustrated in FIG. 1, the brake assembly 10 is de-activated and the spring element 52 is in a passive state.

The chart shown in FIG. 4 illustrates the amount of deflection of the resilient portion 36 of the cushion disc 32 at increasing pressures. Curve 66 represents the curve of the resilient portion 36 of the present invention while curve 68 represents a prior art spring type cushion device. Curve 70 represents a prior art brake assembly having no cushion device. As is evident from this chart, the curve 66 illustrates that the subject cushion disc 32, with resilient portion 36, provides a near optimum spring rate characteristic for the brake assembly 10. FIG. 5 illustrates the resilient portion 36 in a totally compressed state. In this state, deflection and pressure would be at maximum values, with the resilient portion 36 carrying the entire braking load.

FIGS. 6 and 7 illustrates alternate embodiments of the subject invention. In FIG. 6, the resilient portion 74 is dome shaped in cross-section and is bonded directly to a flat planar surface 76 of a piston 78. In FIG. 7, a cushion disc 80 includes a rigid portion 82 and a resilient portion 84. The resilient portion 84 is dome-shaped in cross-section and is bonded to a flat surface 86 of the rigid portion 82. The resilient portions 74 and 84 of the FIGS. 6 and 7 embodiments are preferably formed of an oil and temperature resistant rubber or elastomeric material.

Industrial Applicability

With reference to the drawings, the subject cushioned brake assembly 10 is particularly useful with earthmoving and construction vehicles, but can be advantageously utilized with other types of vehicles which have friction disc clutch or brake assemblies.

With the brake assembly 10 in the position shown in FIG. 1, the shaft 16, hub 14, and friction discs 26 are rotating. The piston 28 and spring element 52 are in their retracted, or inactive, position. The piston 28 and spring element 52 are held in this position by fluid pressure in the cylinder 64, which is supplied by the pump 54, valve 58, lines 60, and fluid pathways 62. To actuate the brake assembly 10, and thereby stop the rotation of the shaft 16, the hub 14, and the friction discs 26, the control valve 58 is moved from the first position 59 to the second position 61. With the control valve 58 in the second position, pressurized fluid is drained from the fluid cylinder 64, the fluid passageways 62, and fluid lines 64 back to the reservoir 56.

Once the fluid cylinder 64 is devoid of pressurized fluid, the spring element 52 moves the piston forward against the resilient portion 36 of the cushion disc 32 and the cushion disc moves against the friction discs 24 and 26. As the rotating discs 26 and the non-rotating discs 24 are forced together, the resilient portion 36 begins to compress and cushion the reaction forces between the rotating and non-rotating components of the brake assembly 10. The resilient portion 36 continues to compress and dampen the forces until the resilient portion is completely compressed, as shown in FIG. 5, and the first and second friction discs are in fully engaged frictional surface contact. This frictional contact stops the rotation of the discs 26, the interconnected hub 14, and the interconnected shaft 16. The cushioned braking action is now complete.

To release the braking action, the control valve 58 is moved to the first position and pressurized fluid is once again introduced into the cylinder 65. The pressurized fluid moves the piston rearward, compressing the spring element 52, and releases the pressure on the resilient portion 36 of the cushion disc 32. Rearward movement of the piston 64 also relaxes the force on the friction discs 24 and 26 and these disc 24,26 separate. In this condition, the shaft 16, the hub 14, and the second friction discs 26 can be rotated once again.

Other aspects, objects, and advantages of this invention can be obtained from a study of the drawings, the disclosure, and the appended claims.

I claim:

1. A cushioned power transfer assembly comprising:
   a stationary housing;
   a rotatable hub;
   a rotatable power shaft splined to said hub;
   a plurality of first friction discs splined to said housing;
   a plurality of second friction discs splined to said hub, each of said second friction discs being adjacent at least one of said first friction discs;
   a powered piston having a planar contact surface and being positioned within and moveable relative to said housing;
   a floating cushion disc, said cushion disc having a rigid plate portion and a resilient portion, said cushion disc being positioned between said piston and said friction discs; and
   power means for moving said piston into contact with said resilient portion and away from said resilient portion.

2. The assembly, as set forth in claim 1, wherein said rigid plate portion of said cushion disc is a metal member and said resilient portion is an elastomeric member, said resilient portion being bonded to said rigid portion.

3. The assembly, as set forth in claim 1, wherein said resilient portion is bonded to said plate portion and has a substantially triangular configuration in cross-section.

4. The assembly, as set forth in claim 1, wherein said rigid plate portion of said cushion disc is a thermoplastic member and said resilient portion is an elastomeric member, said resilient portion being bonded to said plate portion.

5. The assembly, as set forth in claim 1, wherein said rigid plate portion has a first circular surface and said first surface has a plurality of slots formed therein.

6. The assembly, as set forth in claim 1, wherein said rigid plate portion has first and second circular surfaces, said first surface having a plurality of slots formed therein, and said second surface having said resilient portion bonded thereto.

7. The assembly, as set forth in claim 1, wherein said resilient portion of said cushion disc is adjacent said planar contact surface of said powered piston.

8. The assembly, as set forth in claim 1, wherein said resilient portion has a substantially dome-shaped configuration in cross-section.

9. The assembly, as set forth in claim 8, wherein said rigid plate portion has first and second circular surface portions, said first surface portion having a plurality of grooves formed therein, and said second surface portion having said resilient portion bonded thereto.

10. The assembly, as set forth in claim 9, wherein said first surface portion is adjacent said first and second friction discs and said resilient portion is adjacent said planar contact surface of said powered piston.

11. A cushioned friction disc brake assembly comprising:
   a stationary non-rotatable housing;
   a rotatable hub;
   a rotatable shaft connected to said hub for imparting rotary motion from said shaft to said hub;
   a disc pack including a plurality of alternating adjacent first and second friction discs, said first discs being splined to said housing and said second discs being splined to said hub;
   a piston having a substantially flat planar surface, said piston being positioned within said housing and being moveable toward and away from said disc pack; and
   a resilient cushioning member, said resilient cushioning member being bonded to said flat planar surface of said piston.

12. The brake assembly, as set forth in claim 11, wherein said cushioning member has a substantially triangular configuration in cross-section.

* * * * *